(12) United States Patent
Wiegman

(10) Patent No.: US 11,392,143 B1
(45) Date of Patent: Jul. 19, 2022

(54) SYSTEM AND METHOD FOR PRODUCING A CONTROL SIGNAL OF AN ELECTRIC VERTICAL TAKE-OFF AND LANDING (EVTOL) AIRCRAFT

(71) Applicant: BETA AIR, LLC, South Burlington, VT (US)

(72) Inventor: Herman Wiegman, Essex Junction, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/383,572

(22) Filed: Jul. 23, 2021

(51) Int. Cl.
  G05D 1/10    (2006.01)
  G05D 1/00    (2006.01)
  B64D 47/02   (2006.01)
  B64C 29/00   (2006.01)
  B64D 27/24   (2006.01)

(52) U.S. Cl.
  CPC ......... *G05D 1/102* (2013.01); *B64C 29/0008* (2013.01); *B64D 27/24* (2013.01); *B64D 47/02* (2013.01); *G05D 1/0011* (2013.01)

(58) Field of Classification Search
  CPC .. G05D 1/102; G05D 1/0011; B64C 29/0008; B64D 27/24; B64D 47/02
  See application file for complete search history.

(56) References Cited

U.S. PATENT DOCUMENTS

| 3,002,714 | A * | 10/1961 | JamesI ............... B64C 13/24 244/223 |
| 7,576,695 | B2 * | 8/2009 | Smith ............... G01H 17/00 342/457 |
| 7,889,133 | B2 * | 2/2011 | Smith ............... G01S 5/0263 342/450 |
| 7,908,077 | B2 * | 3/2011 | Smith ............... G06Q 10/10 701/120 |
| 9,784,887 | B1 * | 10/2017 | Ulmer ............... G01S 7/4813 |
| 9,908,616 | B1 * | 3/2018 | Horn ............... B64C 29/0033 |
| 10,913,547 | B1 * | 2/2021 | Thrun ............... B64C 29/0025 |
| 10,926,654 | B1 * | 2/2021 | Thrun ............... B60L 53/52 |
| 11,046,457 | B1 * | 6/2021 | Huntzinger ......... G08G 5/025 |

(Continued)

FOREIGN PATENT DOCUMENTS

| CN | 103492264 | A | * | 1/2014 | ............ B64C 33/02 |
| CN | 105539828 | A | * | 5/2016 | |

(Continued)

*Primary Examiner* — Behrang Badii
*Assistant Examiner* — Jalal C Coduroglu
(74) *Attorney, Agent, or Firm* — Caldwell Intellectual Property Law

(57) ABSTRACT

A system for producing a control signal of an electric vertical take-off and landing (eVTOL) aircraft includes a flight controller configured to obtain a requested aircraft force, generate an optimal command mix, wherein the optimal command mix includes a plurality of commands to a plurality of actuators as a function of the requested aircraft force, wherein generating further comprises receiving an ideal actuator model includes at least a performance parameter, producing a model datum as a function of the ideal actuator model, and generating the optimal command mix as a function of the request aircraft force and the model datum, and produce a control signal as a function of the optimal command mix.

20 Claims, 6 Drawing Sheets

(56) References Cited

U.S. PATENT DOCUMENTS

| | | | |
|---|---|---|---|
| 11,198,519 B1* | 12/2021 | Seeley | B64C 9/20 |
| 11,208,200 B1* | 12/2021 | Auerbach | B64C 13/503 |
| 11,225,321 B1* | 1/2022 | Townsend | B64C 29/0025 |
| 2003/0093187 A1* | 5/2003 | Walker | B64D 45/0059 701/1 |
| 2009/0152391 A1* | 6/2009 | McWhirk | B64B 1/70 244/30 |
| 2012/0256042 A1* | 10/2012 | Altmikus | B64C 27/82 244/17.21 |
| 2017/0121034 A1 | 5/2017 | Fisher | |
| 2017/0153650 A1 | 6/2017 | Chang | |
| 2018/0334251 A1* | 11/2018 | Karem | B64C 9/18 |
| 2019/0202546 A1* | 7/2019 | Mahboubi | G05D 1/0858 |
| 2019/0263515 A1* | 8/2019 | Karem | B64C 29/0033 |
| 2019/0291856 A1* | 9/2019 | Kaufman | B64C 27/473 |
| 2019/0291862 A1* | 9/2019 | Lyasoff | B64C 15/02 |
| 2020/0031478 A1* | 1/2020 | Clark | B64D 15/12 |
| 2020/0073410 A1* | 3/2020 | Tillotson | G08G 5/045 |
| 2020/0074320 A1* | 3/2020 | Seshadri | G06N 20/20 |
| 2020/0090073 A1* | 3/2020 | Zhan | G06N 20/00 |
| 2020/0307390 A1* | 10/2020 | Clark | B64D 31/00 |
| 2021/0103876 A1* | 4/2021 | Petrosso | G06F 40/56 |
| 2021/0107626 A1* | 4/2021 | Yuksel | B64C 13/16 |
| 2021/0109547 A1* | 4/2021 | Clark | G05D 1/0816 |

FOREIGN PATENT DOCUMENTS

| | | | | |
|---|---|---|---|---|
| CN | 106029501 A | * | 10/2016 | H04N 5/2328 |
| CN | 109421926 A | * | 3/2019 | B64C 27/08 |
| CN | 109472526 A | * | 3/2019 | G05D 1/0033 |
| EP | 3543119 A1 | * | 9/2019 | B64C 27/08 |
| JP | 2019214354 A | * | 12/2019 | B64C 11/18 |
| WO | WO-2005065071 A2 | * | 7/2005 | B64C 17/10 |
| WO | WO-2015168320 A1 | * | 11/2015 | B64C 13/18 |
| WO | WO-2017149526 A2 | * | 9/2017 | G01S 13/878 |
| WO | WO-2017200610 A1 | * | 11/2017 | B64C 3/385 |
| WO | WO-2019005131 A1 | * | 1/2019 | B64C 13/24 |
| WO | WO-2019241768 A1 | * | 12/2019 | B64D 47/08 |
| WO | WO-2021118925 A1 | * | 6/2021 | B64C 13/16 |

* cited by examiner

SYSTEM AND METHOD FOR PRODUCING A CONTROL SIGNAL OF AN ELECTRIC VERTICAL TAKE-OFF AND LANDING (EVTOL) AIRCRAFT

FIELD OF THE INVENTION

The present invention generally relates to the field of electric aircrafts. In particular, the present invention is directed to a system and method for producing a control signal of an electric vertical take-off and landing (eVTOL) aircraft.

BACKGROUND

Aircrafts often operate inefficiently due to the large number of degrees of freedom that need to be accounted. Specifically, inefficiency is generated due to a poorly computed determination of one or more aircraft parameters such as position, speed, etc. This is further complicated by the introduction of electric aircrafts that result in more degrees of freedom that are required to be determined.

SUMMARY OF THE DISCLOSURE

In an aspect, a system for producing a control signal of an electric vertical take-off and landing (eVTOL) aircraft includes a flight controller configured to obtain a requested aircraft force, generate an optimal command mix, wherein the optimal command mix includes a plurality of commands to a plurality of actuators as a function of the requested aircraft force, wherein generating further comprises receiving an ideal actuator model includes at least a performance parameter, producing a model datum as a function of the ideal actuator model, and generating the optimal command mix as a function of the request aircraft force and the model datum, and produce a control signal as a function of the optimal command mix.

In another aspect, a method for producing a control signal of an electric vertical take-off and landing (eVTOL) aircraft includes obtaining, by a flight controller, a requested aircraft force, generating, by the flight controller, an optimal command mix, wherein the optimal command mix includes a plurality of commands to a plurality of actuators as a function of the requested aircraft force, wherein generating further comprises receiving an ideal actuator model includes at least a performance parameter, producing a model datum as a function of the ideal actuator model, and generating the optimal command mix as a function of the request aircraft force and the model datum, and producing, by the flight controller, a control signal as a function of the optimal command mix.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems and methods for producing a control signal of an electric vertical take-off and landing (eVTOL) aircraft. In an embodiment, this disclosure can obtain a requested aircraft force. Aspects of the present disclosure can also be used to generate an optimal command mix as a function of the requested aircraft force. This is so, at least in part, because the disclosure includes a plurality of commands to a plurality of plurality of actuators. Aspects of the present disclosure allow for producing a control signal as a function of the optimal command mix. Exemplary embodiments illustrating aspects of the present disclosure are described below in the context of several specific examples.

Figure 1:
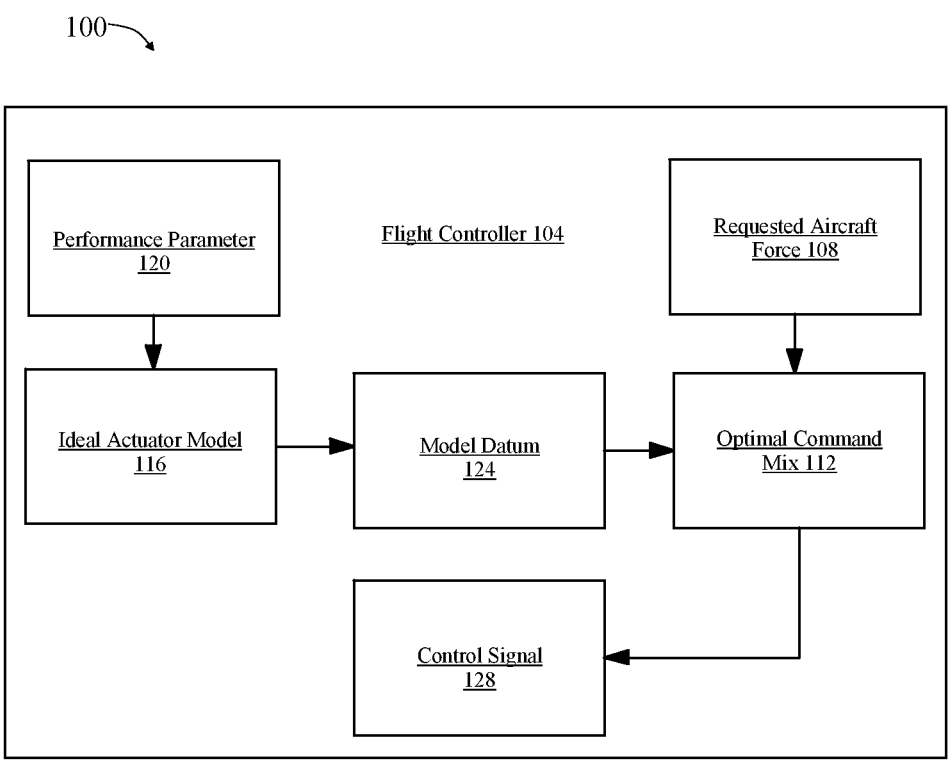
FIG. 1 is a block diagram of a system for producing a control signal of an electric vertical take-off and landing (eVTOL) aircraft according to an embodiment of the invention.

Referring now to FIG. 1, an exemplary embodiment of a system 100 for initiating a command of an electric vertical take-off and landing (eVTOL) aircraft is illustrated. System includes a flight controller 104. As used in this disclosure a "flight controller" is a computing device of a plurality of computing devices dedicated to data storage, security, distribution of traffic for load balancing, and flight instruction. Flight controller 104 may include and/or communicate with any computing device as described in this disclosure, including without limitation a microcontroller, microprocessor, digital signal processor (DSP) and/or system on a chip (SoC) as described in this disclosure. Further, flight controller 104 may include a single computing device operating independently, or may include two or more computing device operating in concert, in parallel, sequentially or the like; two or more computing devices may be included together in a single computing device or in two or more computing devices. In embodiments, flight controller 104 may be installed in an aircraft, may control the aircraft remotely, and/or may include an element installed in the aircraft and a remote element in communication therewith.

In an embodiment, and still referring to FIG. 1, flight controller 104 may include a reconfigurable hardware platform. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform may be reconfigured to enact any algorithm and/or algorithm selection process received from another computing device and/or created using machine-learning and/or neural net processes as described below.

Still referring to FIG. 1, flight controller 104 may include, be included in, and/or communicate with a mobile device such as a mobile telephone or smartphone. Further, flight controller 104 may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 1, flight controller 104 may include, but is not limited to, for example, a cluster of computing devices in a first location and a second computing device or cluster of computing devices in a second location. Flight controller 104 may include one or more computing devices dedicated to data storage, security, distribution of traffic for load balancing, and the like. Flight controller 104 may be configured to distribute one or more computing tasks as described below across a plurality of computing devices of computing device, which may operate in parallel, in series, redundantly, or in any other manner used for distribution of tasks or memory between computing devices. Flight controller 104 may also be implemented using a "shared nothing" architecture in which data is cached at the worker, in an embodiment, this may enable scalability of aircraft 100 and/or computing device.

In an embodiment, and with continued reference to FIG. 1, flight controller 104 may be designed and/or configured to perform any method, method step, or sequence of method steps in any embodiment described in this disclosure, in any order and with any degree of repetition. For instance, flight controller 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, flight controller 104 is configured to obtain a requested aircraft force 108. As used in this disclosure a "requested aircraft force" is a measurable value of force exerted on a flight component that is requested and/or desired, wherein a flight component is described below. In an embodiment, and without limitation, requested aircraft force 108 may denote an expectation for a propeller to exert 160 lb. ft. of torque. As a further non-limiting example, desired torque may denote a request for a propulsor to exert 290 lb. ft. of torque. In an embodiment, and without limitation, requested aircraft force 108 may be obtained as a function of a collective control. As used in this disclosure a "collective control" is a mechanical control of an aircraft that allows a pilot to request an aircraft force. For example, and without limitation, collective control may include one or more hover controls, thrust controls, inceptor sticks, cyclic controls, yoke controls, and the like thereof. As a further non-limiting example, collective control may include one or more roll sticks, rudder pedals, pitch sticks, throttle controls, and the like thereof. In an embodiment, and without limitation, collective control may control one or more control surfaces, such as but not limited to rudders, ailerons, elevators, and the like thereof. In another embodiment, and without limitation, collective control may include one or more nozzles, diverters, physical structures, vanes, and the like thereof. Additionally or alternatively, requested aircraft force may include a pilot desire and/or pilot request to affect one or more speeds, directions, attitudes, orientations, and the like thereof of eVTOL aircraft.

In an embodiment, and still referring to FIG. 1, requested aircraft force 108 may be obtained as a function of a receiving a pilot input. As used in this disclosure a "pilot input" is a signal and/or input received from a pilot directed to maneuvering eVTOL aircraft. For example, pilot input may include one or more inputs received that directs a propulsor to increase a torque. As a further non-limiting example, pilot input may include one or more inputs received that direct an aileron to adjust an angle. In an embodiment, pilot input may include an implicit signal and/or an explicit signal. For example, and without limitation, input may include an explicit signal, wherein the pilot explicitly enters a requested aircraft force and/or flight maneuver. As a further non-limiting example, pilot input may include an explicit signal directing a rudder to rotate 3°. As a further non-limiting example, pilot input may include an implicit signal, wherein flight controller 104 detects a torque alteration, flight path deviation, and the like thereof, wherein aircraft requested force 108 may be obtained as a function of the torque alteration, flight path deviation, and the like thereof. In an embodiment, and without limitation, pilot input may include one or more explicit signals to reduce torque, and/or one or more implicit signals that torque may be reduced due to reduction of airspeed velocity. In an embodiment, and without limitation, pilot input may include one or more local and/or global requested aircraft forces. For example, and without limitation, pilot input may include a local requested aircraft force that is transmitted by a pilot and/or crew member. As a further non-limiting example, pilot input may include a global requested aircraft force that may be transmitted by air traffic control and/or one or more remote users that are in communication with the pilot and/or flight controller of eVTOL aircraft. In an embodiment, pilot input may be obtained as a function of a tri-state bus and/or multiplexor that denotes an explicit pilot input should be transmitted prior to any implicit or global requested aircraft force.

Still referring to FIG. 1, flight controller 104 is configured to generate an optimal command mix 112 as a function of requested aircraft force 108. As used in this disclosure an "optimal command mix" is a plurality of angles, torques, and/or forces that produces an optimized effectiveness of one or more flight elements, wherein effectiveness is the degree to which something is successful and/or efficient. For example, and without limitation, optimal command mix 112 may denote that an angle of 4° for a rudder may be optimal, wherein an angle of 7° may be inefficient and/or non-optimal. As a further non-limiting example, optimal command mix 112 may denote that a torque of 240 lb. ft. of torque may be optimal for a propeller. Optimal command mix 112 includes a plurality of commands. As used in this disclosure a "command" is a flight maneuver and/or adjustment to be performed. For example, and without limitation, command may denote an adjustment of one or more flight components, wherein a flight component is described below in detail. Optimal command mix 112 includes a plurality of commands to a plurality of actuators. As used in this disclosure an "actuator" is a motor that may adjust an angle and/or position of one or more flight components, wherein a flight component is described below in detail. For example, and without limitation an actuator may adjust a rotor 4° in the horizontal axis. As a further non, limiting example, an actuator may adjust a propulsor from a first vertically aligned angle to a second vertically aligned angle. As a further non-limiting example, an actuator may comprise a motor and/or motor shaft, wherein actuator commands the shaft to rotate at a specified rotational speed and/or rotational velocity. In an embodiment, and without limitation, actuator may be secured to a flight component, wherein a flight component is a portion of an aircraft that can be moved or adjusted to affect one or more flight elements as described below, in reference to FIG. 3. As used in this disclosure, "secured" means that at least a portion of a device, component, or circuit is connected to at least a portion of the aircraft via a mechanical coupling and/or attachment and/or fastening component and/or mechanism. Securement may be accomplished, without limitation, by bolting, riveting, welding, press fitting, and the like thereof. For example, and without limitation a solid and/or round head rivet may be used to attach a flight component to an actuator. As a further non-limiting example, a blind and/or pop rivet may be used to attach a flight component to an actuator. As a further non-limiting example, an oxy-acetylene weld and/or electric arc weld may be used to attach a flight component to an actuator. As a further non-limiting example, a shielded metal arc weld and/or gas metal arc weld may be used to attach a flight component to an actuator. As a further non-limiting example, a composite press-fit insert may be used to attach a flight component to an actuator. As a non-limiting example, flight component may include a component used to affect the aircrafts' roll and pitch which may comprise one or more ailerons. As a further example, flight component may include a rudder to control yaw of an aircraft. In an embodiment, actuator may maneuver and/or orient a flight component. As a non-limiting example, optimal command mix 112 may command an actuator secured to a flight component secured at a first vertical axis, wherein the first vertical axis may include a 3° inward and/or 1.4° forward, to maneuver and/or shift +/−15° in the horizontal and/or longitudinal axis. In an embodiment, and without limitation, actuator may include landing gear. Landing gear may be used for take-off and/or landing/ Landing gear may be used to contact ground while aircraft 300 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

Still referring to FIG. 1, flight controller 104 is configured to receive an ideal actuator model 116, the ideal actuator model 116 including at least a performance parameter 120. As used in this disclosure an "ideal actuator model" is a set of data corresponding to a virtual actuator's torque output. Ideal actuator model 116 may be a computer program or computer application that represents actuator torque performance given a certain set of conditions. This set of conditions includes performance parameter 120. As used in this disclosure "performance parameter" is a parameter denoting an element that effects an aircraft function. For example, and without limitation, performance parameter 120 may be environmental such as air density, air speed, true airspeed, relative airspeed, temperature, humidity level, and weather conditions, among others. Performance parameter 120 may include actuator parameters that define an actuator physical characteristics and/or specifications such as material properties, electrical characteristics, actuator type, weight, geometry, speed, and revolutions per minute (rpm), among others. Performance parameter 120 may include velocity and/or speed in a plurality of ranges and direction such as vertical speed, horizontal speed, changes in angle or rates of change in angles like pitch rate, roll rate, yaw rate, or a combination thereof, among others.

Still referring to FIG. 1, flight controller 104 generates optimal command mix 112 as a function of producing a model datum 124. As used in this disclosure a "model datum" is an element of data that represents an ideal actuator output form an ideal actuator model. One of ordinary skill in the art, after reviewing the entirety of this disclosure, would appreciate that model datum 124 is the actuator output of an ideal virtual actual data from a perfect actuator given performance parameter 120 of a plurality of performance parameters. For example, in a nonlimiting embodiment, ideal actuator model 116 may include performance parameter 120 including air density, actuator type, electrical input, and rpm. Model datum 124 may be produced by flight controller 104 to represent what a perfect (ideal) actuator would output as torque given those performance parameters 120. In an embodiment, and without limitation, flight controller may include a model datum threshold, wherein model datum threshold may include a range of acceptable actuator values associated with model datum 124. Model datum threshold may be a minimum and maximum actuator value associated with model datum. Flight controller 104 may be configured to detect if output actuator datum is outside model datum threshold, which may then trigger detection of datums consistent with this disclosure. Model datum may additionally or alternatively include any model datum used as a model torque datum and/or model datum as described in U.S. Nonprovisional application Ser. No. 17/186,079, filed on Feb. 26, 2021, and entitled "METHODS AND SYSTEM FOR ESTIMATING PERCENTAGE TORQUE PRODUCED BY A PROPULSOR CONFIGURED FOR USE IN AN ELECTRIC AIRCRAFT," the entirety of which is incorporated herein by reference.

In an embodiment, and still referring to FIG. 1, flight controller 104 may utilize stored data to produce model datum 124. Stored data may be past actuator outputs related to performance parameters 120 desired for the instant model in an embodiment of the present invention. Stored data may be input by a user, pilot, support personnel, or another. Stored data may include algorithms and machine-learning processes that may produce model datum 124 considering at least a performance parameter 120. The algorithms and machine-learning processes may be any algorithm or machine-learning processes as described herein. Training data may be columns, matrices, rows, blocks, spreadsheets, books, or other suitable datastores or structures that contain correlations between past torque outputs to performance parameters. Training data may be any training data as described below. Training data may be past measurements detected by any sensors described herein or another sensor or suite of sensors in combination. Training data may be detected by onboard or offboard instrumentation designed to detect output torque and performance parameters as described herein. Training data may be uploaded, downloaded, and/or retrieved from a server prior to flight. Training data may be generated by a computing device that may simulate actuator outputs and correlated performance parameters suitable for use by the flight controller 104 in an embodiment of the present invention. Flight controller 104 and/or another computing device as described in this disclosure may train one or more machine-learning models using the training data as described in this disclosure. Training one or more machine-learning models consistent with the training one or more machine learning modules as described in this disclosure.

In an embodiment, and without limitation, flight controller 104 may produce model datum 124 as a function of determining an effectivity element. As used in this disclosure an "effectivity element" is a measurable value representing an effectiveness and/or efficiency of an actuator in performing a flight maneuver and/or action. For example, and without limitation effectivity element may denote one or more efficiencies represented as a percentage, ratio, true/false, yes/no, and the like thereof. As a further non-limiting example, effectivity element may denote that an actuator is 58% effective at successfully performing an action and/or flight maneuver. In an embodiment, and without limitation, flight controller 104 may determine effectivity element as a function of identifying an effectiveness of flight component. As used in this disclosure an "effectiveness" is a measurable value representing a degree to which a flight component is successful in producing a flight maneuver. For example, and without limitation, a flight component comprising a propulsor may have an effectiveness of 88% for producing a lift, wherein a rudder may have an effectiveness of 12% for producing the lift. As a further non-limiting example, a flight component comprising an aileron may have an effectiveness of 94% for turning an aircraft, wherein a landing gear may have an effectiveness of 9% for turning an aircraft. In an embodiment and without limitation, flight controller 104 may effectivity element may include an actuator percentage datum. An "actuator percentage datum", for the purposes of this disclosure, is an element of data representing the actual actuator force produced by an actuator compared to the modeled actuator force output of the same ideal actuator given the same performance parameters. For example, in a nonlimiting embodiment, flight controller 104 may generate actuator percentage datum by dividing output actuator force datum by model datum, wherein output actuator force datum may be detected by a sensor and model datum generated from receiving ideal actuator model 116. Performance parameter 120 may replicate the conditions that actuator is operating under. For example, in a nonlimiting embodiment, performance parameter 120 may include air density, temperature, humidity, propulsor type and electrical input that match exactly values the actual eVTOL aircraft is operating under, and therefore model datum 124 would represent an ideal actuator in those conditions. Actuator percentage datum, in other words, may represent the torque output of an actual propulsor versus the same propulsor in an ideal world, giving way to a percentage of ideal actuator force. Actuator percentage datum may be represented as a fraction, percentage, decimal, or other mathematical representation of part of a whole. One of ordinary skill in the art, after reviewing the entirety of this disclosure would appreciate that there are virtually limitless visual, auditory, haptic or other types of representations that actuator percentage datum may take.

In an embodiment, and still referring to FIG. 1, flight controller 104 may generate optimal command mix 112 as a function of dynamically varying the plurality of actuators as a function of requested aircraft force 108. As used in this disclosure "dynamically varying" is a process of altering and/or adjusting an actuator as a function of the requested aircraft force. For example, and without limitation, dynamically varying may include identifying a first model datum as a function of a first requested aircraft force and subsequently identifying a second model datum as a function of a second requested aircraft force. In an embodiment, and without limitation, flight controller 104 may dynamically vary actuator such that a maximal effectiveness is determined. As used in this disclosure a "maximal effectiveness" is a maximum measurable value associated with an effectiveness and/or efficiency. For example, and without limitation, a propulsor may exert a maximal effectiveness for producing lift as a function of an actuator orienting the propulsor at 3° inward. In an embodiment, and without limitation, flight controller 104 may dynamically vary actuator with requested aircraft force 108 as a function of producing an effectivity simulation. As used in this disclosure an "effectivity simulation" is an imitation of eVTOL aircraft, actuator, and/or flight component an aircraft. For example, and without limitation, effectivity simulation may denote at least a flight element of VTOL aircraft, wherein a flight element is an element of datum denoting a relative status of aircraft described below in detail, in reference to FIG. 3. In an embodiment, and without limitation, flight element may denote one or more torques, thrusts, airspeed velocities, forces, altitudes, groundspeed velocities, directions during flight, directions facing, forces, orientations, and the like thereof. In an embodiment, and without limitation, flight controller 104 may produce effectivity simulation denoting one or more adjustments to an effectiveness as a function of a requested aircraft force 108. For example, and without limitation, flight controller 104 may produce effectivity simulation denoting one or more adjustments to an effectiveness as a function of an adjusted and/or shifted flight component and/or actuator during flight. As a further non-limiting example, flight controller 104 may produce effectivity simulation denoting one or more modifications to an efficiency as a function of a changing and/or altered actuator orientation. As a further non-limiting example, flight controller 104 may produce effectivity simulation denoting one or more modifications to an efficiency as a function of a changing and/or altered flight component. In an embodiment, and without limitation, flight controller 104 may be configured to include operational data of flight component for a plurality of simulated conditions. As used in this disclosure "operational data" is information denoting one or more operational functions of a flight component. For example, and without limitation, operational data may denote one or more rotational speeds, torques, forces, rpms, and the like thereof. For example, and without limitation, operational data may denote that a propeller is rotating at a speed of 800 rpms. As a further non-limiting example, operational data may denote that an aileron is angled at 3.3° upward. In an embodiment, and without limitation, operational data may denote one or more voltage levels, electromotive force, current levels, temperature, current speed of rotation, and the like thereof. In another embodiment, operational data may denote one or more electrical parameters of a flight component such as a voltage, current, and/or ohmic resistance of flight component. As used in this disclosure a "simulated condition" is a condition and/or environment that is to be simulated for flight condition. For example, and without limitation, simulated conditions may include an environmental condition of a wind force and/or precipitation. As a further non-limiting example, simulated conditions may include one or more alterations and/or modifications of operational datum.

Still referring to FIG. 1, flight controller 104 may generate optimal command mix 112 as a function of requested aircraft force 108 and model datum 124. In an embodiment, and without limitation, flight controller 104 may generate optimal command mix 112 as a function of training an optimal machine-learning model. As used in this disclosure a "optimal machine-learning model" is a machine-learning model to generate an optimal command mix output given a requested aircraft force and/or model datum as an input; this is in contrast to a non-machine learning software program where the commands to be executed are determined in advance by a user and written in a programming language. Optimal machine-learning model may include one or more optimal machine-learning processes such as supervised, unsupervised, or reinforcement machine-learning processes that flight controller 104 and/or a remote device may or may not use in the generation of optimal command mix 112. As used in this disclosure "remote device" is an external device to flight controller 104. Additionally or alternatively, optimal machine-learning model may include one or more optimal machine-learning processes that a field-programmable gate array (FPGA) may or may not use in the generation of command. Optimal machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 1, optimal machine learning model may be trained as a function of an optimal training set, wherein optimal training set may correlate a plurality of requested aircraft forces to a plurality of model data to an optimal command mix. Optimal training data may be received as a function of user-entered valuations of requested aircraft forces, model data, and/or optimal command mixes. Flight controller 104 may receive optimal training data by receiving correlations of requested aircraft forces and/or model data to optimal command mixes that were previously received and/or determined during a previous iteration of generation of optimal command mix 112. Optimal training data may be received by one or more remote devices and/or FPGAs that at least correlate a requested aircraft force and/or model datum to an optimal command mix. Optimal training data may be received in the form of one or more user-entered correlations of a requested aircraft force and/or model datum to an optimal command mix. Additionally or alternatively, flight controller 104 may receive optimal machine-learning model from a remote device and/or FPGA that utilizes one or more optimal machine learning processes, wherein a remote device and an FPGA is described above in detail. For example, and without limitation, a remote device may include a computing device, external device, processor, FPGA, microprocessor and the like thereof. Remote device and/or FPGA may perform the optimal machine-learning process using optimal training data to generate optimal command mix 112 and transmit the output to flight controller 104. Remote device and/or FPGA may transmit a signal, bit, datum, or parameter to flight controller 104 that at least relates to command. Additionally or alternatively, the remote device and/or FPGA may provide an updated machine-learning model. For example, and without limitation, an updated machine-learning model may be comprised of a firmware update, a software update, an optimal machine-learning process correction, and the like thereof. As a non-limiting example a software update may incorporate a new requested aircraft force that relates to a modified model datum. Additionally or alternatively, the updated machine learning model may be transmitted to the remote device and/or FPGA, wherein the remote device and/or FPGA may replace the optimal machine-learning model with the updated machine-learning model and generate the optimal command mix as a function of the model datum, requested aircraft force and/or optimal command mix using the updated machine-learning model. The updated machine-learning model may be transmitted by the remote device and/or FPGA and received by flight controller 104 as a software update, firmware update, or corrected optimal machine-learning model. For example, and without limitation optimal machine learning model may utilize a neural net machine-learning process, wherein the updated machine-learning model may incorporate a gradient boosting machine-learning process. Machine-learning model may be transmitted, without limitation, in the form of a software update, a firmware update, and/or a bitstream reconfiguring an FPGA or similar device; machine-learning model may be transmitted in the form of coefficients, weights, and/or other parameters that have been tuned as part of a machine-learning process as described in further detail below.

Still referring to FIG. 1, optimal machine-learning model may include a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Flight controller 104 and/or another device may generate a classifier using a classification algorithm, defined as a processes whereby a flight controller 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, flight controller 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Flight controller 104 may then calculate a likelihood table by calculating probabilities of different data entries and classification labels. Flight controller 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, flight controller 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, flight controller 104 may generate optimal command mix 112 as a function of generating an objection function to score and weight factors to achieve an optimal command mix for each grouping of requested aircraft forces and/or model data. In some embodiments, groupings may be scored in a matrix for optimization, where columns represent predictive prevalence value and rows represent pooling thresholds potentially paired therewith; each cell of such a matrix may represent a score of a grouping of the corresponding optimal command mix.

With continued reference to FIG. 1, flight controller 104 may generate optimal command mix 112 as a function of optimizing the objective function by performing a greedy algorithm process. A "greedy algorithm" is defined as an algorithm that selects locally optimal choices, which may or may not generate a globally optimal solution. For instance, flight controller 104 may select groupings so that scores associated therewith are the best score for each predictive prevalence value and/or for each pooling threshold. In such an example, optimization may generate optimal command mix 112 such that each actuator position and/or orientation includes the highest score possible.

Still referring to FIG. 1, objective function may be formulated as a linear objective function. Which flight controller 104 may solve using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is the set of all predictive prevalence values r, S is a set of all pooling thresholds s, $c_{rs}$ is a score of a grouping of a given predictive prevalence value with a given pooling threshold, and $x_{rs}$ is 1 if a predictive prevalence value r is grouped with a pooling threshold s, and 0 otherwise. Continuing the example, constraints may specify that each predictive prevalence value is assigned to only one pooling threshold, and each pooling threshold is assigned only one predictive prevalence value. Sets of predictive prevalence values may be optimized for a maximum score combination of all generated predictive prevalence values. In various embodiments, flight controller 104 may determine combination of predictive prevalence values that maximizes a total score subject to a constraint that all predictive prevalence values are paired to exactly one pooling threshold. A mathematical solver may be implemented to solve for the set of feasible groupings that maximizes the sum of scores across all groupings; mathematical solver may implemented on flight controller 104 and/or another remote device, and/or may be implemented on third-party solver.

With continued reference to FIG. 1, optimizing objective function may include minimizing a loss function, where a "loss function" is an expression an output of which an optimization algorithm minimizes to generate an optimal result. As a non-limiting example, flight controller 104 may assign variables relating to a set of parameters, which may correspond to score components as described above, calculate an output of mathematical expression using the variables, and select a grouping that produces an output having the lowest size, according to a given definition of "size," of the set of outputs representing each predictive prevalence value; size may, for instance, included absolute value, numerical size, or the like. Selection of different loss functions may result in identification of different potential groupings as generating minimal outputs. Objectives represented in an objective function and/or loss function may include maximizing the requested aircraft force and/or maximizing the optimal command mix.

Still referring to FIG. 1, flight controller 104 may generate optimal command mix 112 as a function of receiving a sensor input. As used in this disclosure a "sensor input" is one or more inputs denoting one or more current distances, angles, orientations, speeds, velocities, forces, visual representations and the like thereof associated to an aircraft. For example, and without limitation, sensor input may denote that eVTOL aircraft is 500 m above ground. As a further non-limiting example, sensor input may denote that eVTOL aircraft is angled at 3° eastward, wherein eVTOL aircraft is traveling at a velocity of 910 km/h. As a further non-limiting example sensor input may denote that eVTOL aircraft comprises a 3° lift angle and/or a 7° angle of attack. Additionally or alternatively, sensor input may denote one or more forces representing an eVTOL degree of freedom of movement, such as but not limited to forces in the forward/back, side/side, and up/down directions and moments about the longitudinal (roll) axis, the transverse (pitch) axis, and/or the vertical (yaw) axis. Additionally or alternatively, sensor input may denote an inertial measurement. As used in this disclosure an "inertial measurement" is an element of datum denoting one or more forces, angular rates, and/or orientations. For example, and without limitation, inertial measurement may include a measurement of 5 m/s$^2$ for an aircraft's acceleration in a northeastern direction. In an embodiment, inertial measurement may include generating a moving map display. As used in this disclosure a "moving map display" is a digital map archive representing one or more position outputs. For example, and without limitation, moving map display may identify one or more movements, orientations, and/or velocities of aircraft over a digital map. In an embodiment, and without limitation, inertial measurement may be determined as a function of magnetic sensors or magnetometers such as Hall effect sensors, compasses such as solid-state compasses, or the like; one or more magnetometers may include a plurality of magnetometers, such as three or more magnetometers positioned to span three dimensions of possible orientation, so that any direction and magnitude of change in magnetic field in three dimensions may be detected and measured in three dimensions, possibly for measurement of the aircraft's orientation to the Earth's true North or detection of magnetic anomalies. In another embodiment, inertial measurement may be determined as a function of a MEMS sensor, inertial measurement unit (IMU), an accelerometer, wherein one or more accelerometers may include a plurality of accelerometers, such as three or more accelerometers positioned to span three dimensions of possible acceleration, so that any direction and magnitude of acceleration in three dimensions may be detected and measured in three dimensions, and the like thereof. In another embodiment, and without limitation, inertial measurement may be determined as a function of one or more gyroscopes; one or more gyroscopes may include a plurality of gyroscopes, such as three or more gyroscopes positioned to span three dimensions of possible acceleration, so that any direction and magnitude of change in angular position in three dimensions may be detected and measured in three dimensions. Additionally or alternatively, sensor input may denote one or more images and/or visual representations such as snapshots, pictures, videos, and the like thereof.

Still referring to FIG. 1, flight controller 104 may receive sensor input as a function of obtaining an aircraft status. As used in this disclosure an "aircraft status" is status of aircraft for both critical and non-critical functions. For example, and without limitation, aircraft status may denote one or more functions and/or operations that are operating within a safe range. As a further non-limiting example, aircraft status may denote one or more functions and/or operations that are operating within a hazardous range. In an embodiment, and without limitation, aircraft status may denote a wing tilt angle. As used in this disclosure a "wing tilt angle" is an angle that extends from the longitudinal axis to the vertical yaw axis. In an embodiment, and without limitation, wing tilt angle may denote a wing pitch and/or pitch angle. Additionally or alternatively, aircraft status may denote a rotor tilt angle. As used in this disclosure a "rotor tilt angle" is an angle that extends from the longitudinal axis to a secondary axis, such as but not limited to the vertical yaw axis and/or the pitch axis. For example, and without limitation, rotor tilt angle may include a nominal angle. As used in this disclosure a "nominal angle" is an angle of the rotor in a horizontal axis. For example, and without limitation, a nominal angle may include a 3° angle tilted forward and/or a 3° angle tilted backward. Additionally or alternatively, rotor tilt angle may include a canted angle. As used in this disclosure a "canted angle" is an angle of the propulsor in longitudinal direction. For example, and without limitation, a nominal angle may include a 5.5° angle tilted inward and/or a 5.5° angle tilted outward. In an embodiment, and without limitation, rotor tilt angle may be comprised of a nominal angle and/or a canted angle. For example, and without limitation, rotor tilt angle may be an angle of 3.4° inward and/or 5.2° forward. As a further non-limiting example, a fixed angle may be an angle of 3 inward and/or 0.6° forward.

Still referring to FIG. 1, sensor input may be received as a function of a sensor. As used in this disclosure a "sensor" is a device, module, and/or subsystem, utilizing any hardware, software, and/or any combination thereof to detect events and/or changes in the instant environment and transmit the information. Sensor may be attached via a mechanically and/or communicatively coupled to eVTOL aircraft. As used herein, "communicatively connecting" is a process whereby one device, component, or circuit is able to receive data from and/or transmit data to another device, component, or circuit. A communicative connection may be achieved through wired or wireless electronic communication, either directly or by way of one or more intervening devices or components. Further, communicative connecting can include electrically coupling at least an output of one device, component, or circuit to at least an input of another device, component, or circuit. For example, via a bus or other facility for intercommunication between elements of a computing device as described in this disclosure. Communicative connecting may also include indirect connections via wireless connection, radio communication, low power wide area network, optical communication, magnetic, capacitive, or optical coupling, or the like. For example, and without limitation, sensor may include a potentiometric sensor, inductive sensor, capacitive sensor, piezoelectric sensor, strain gauge sensor, variable reluctance sensor, and the like thereof. Sensor may include one or more environmental sensors, which may function to sense parameters of the environment surrounding the aircraft. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor may include a geospatial sensor. Sensor may be located inside aircraft; and/or be included in and/or attached to at least a portion of the aircraft. Sensor may include one or more proximity sensors, displacement sensors, vibration sensors, and the like thereof. Sensor may be used to monitor the status of aircraft for both critical and non-critical functions. Sensor may be incorporated into vehicle or aircraft or be remote. Sensor may be communicatively connected to an energy source and/or motor, wherein an energy source and motor are described in detail below, in reference to FIG. 2, and wherein sensor detects one or more conditions of the energy source and/or motor.

Still referring to FIG. 1, flight controller 104 produces a control signal 128 as a function of optimal command mix 112. As used in this disclosure a "control signal" is a direction and/or guidance directing an actuator and/or a flight component to perform an action and/or motion. In an embodiment, and without limitation, control signal 128 may include a command to alter and/or shift about an axis. For example, and without limitation, control signal 128 may include a command to rotate a rudder 3° about a vertical axis. In another embodiment, and without limitation, control signal 128 may include a command to reverse a first torque magnitude and/or direction. In another embodiment, and without limitation, control signal 128 may include one or more commands to direct a flight component and/or actuator to alter a heading, speed, altitude, departure angle, approach angle, route paths, and the like thereof.

Still referring to FIG. 1, flight controller 104 may produce control signal 128 as a function of generating an autonomous function. As used in this disclosure an "autonomous function" is a mode and/or function of flight controller 104 that controls an actuator, flight component, and/or eVTOL aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of maneuvering and/or adjusting an actuator, flight component, and the like thereof. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 104 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 104 will control the ailerons and/or rudders. As used in this disclosure "non-autonomous mode" is a mode that denotes a pilot will control aircraft and/or maneuvers of aircraft in its entirety.

In an embodiment, and still referring to FIG. 1, producing control signal 128 may comprise transmitting a notification to a pilot. As used in this disclosure a "notification" is a signal and/or form of communication that relays a message regarding and/or representing optimal command mix 112. In an embodiment, and without limitation, notification may be transmitted as a function of a notification unit. As used in this disclosure a "notification unit" is a component capable of producing and/or emitting a notification and/or signal to a pilot. In an embodiment, and without limitation, notification unit may include a graphical user interface (GUI). For the purposes of this disclosure, a "graphical user interface" is a device configured to present data or information in a visual manner to a pilot, computer, camera or combination thereof. Notification unit may be configured to display information regarding eVTOL aircraft, optimal command mix, actuator, and/or flight component. Notification unit may be configured to display information regarding a failure of a flight component and/or a failure of an energy source. Notification unit may prompt a pilot to input a pilot signal as a function of a required interaction and/or response. Notification unit may be configured to receive haptic, audio, visual, gesture, passkey, or other type of interaction from the pilot. Notification unit may perform one or more functions in response to the interaction from the pilot. In non-limiting examples, and without limitation, notification unit may transmit a pilot input to flight controller 104 when an affirmative interaction is received from the pilot, the signal indicating to transmit one or more signals to other components communicatively connected thereto, such as flight component and/or actuator.

Figure 2:
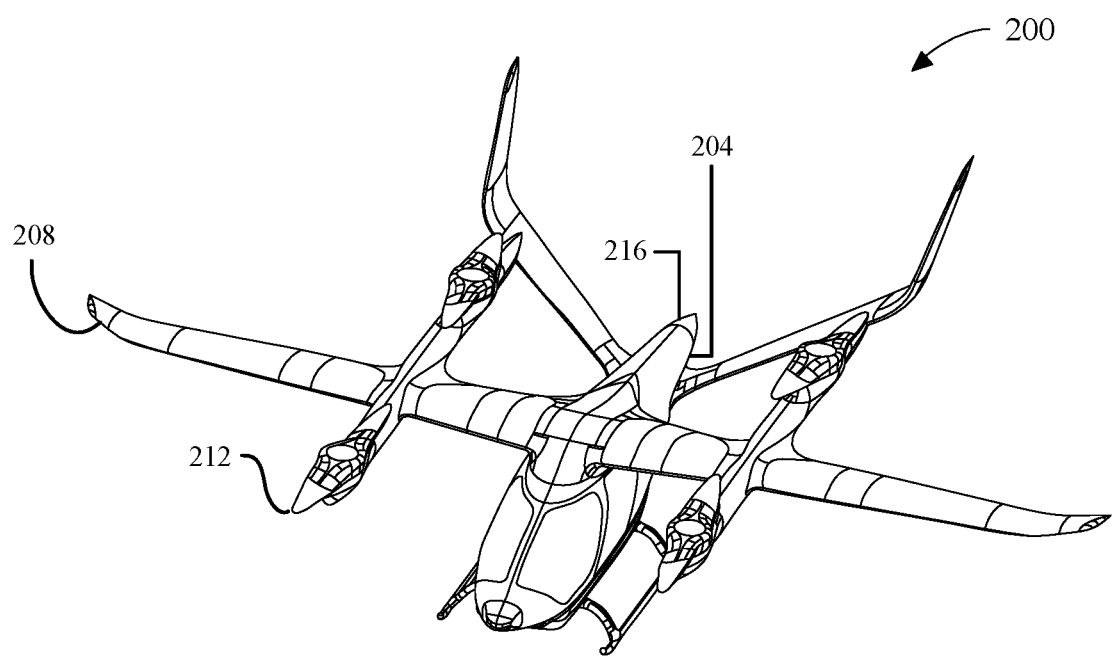
FIG. 2 is a diagrammatic representation of an exemplary embodiment of an eVTOL aircraft.

Now referring to FIG. 2, an eVTOL aircraft 200 is illustrated. eVTOL aircraft 200 may include any eVTOL aircraft as described above, in reference to FIG. 1. eVTOL aircraft may include a fuselage 204. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 204 may comprise structural elements that physically support the shape and structure of an aircraft. Structural elements may take a plurality of forms, alone or in combination with other types. Structural elements may vary depending on the construction type of aircraft and specifically, the fuselage. Fuselage 204 may comprise a truss structure. A truss structure is often used with a lightweight aircraft and comprises welded steel tube trusses. A truss, as used herein, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later in this paper.

In embodiments, fuselage 204 may comprise geodesic construction. Geodesic structural elements may include stringers wound about formers (which may be alternatively called station frames) in opposing spiral directions. A stringer, as used herein, is a general structural element that comprises a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along the length of the interior of fuselage 204 orthogonal to the longitudinal (nose to tail) axis of the aircraft and forms the general shape of fuselage 204. A former may comprise differing cross-sectional shapes at differing locations along fuselage 204, as the former is the structural element that informs the overall shape of a fuselage 204 curvature. In embodiments, aircraft skin can be anchored to formers and strings such that the outer mold line of the volume encapsulated by the formers and stringers comprises the same shape as eVTOL aircraft 200 when installed. In other words, former(s) may form a fuselage's ribs, and the stringers may form the interstitials between such ribs. The spiral orientation of stringers about formers provides uniform robustness at any point on an aircraft fuselage such that if a portion sustains damage, another portion may remain largely unaffected. Aircraft skin would be mechanically coupled to underlying stringers and formers and may interact with a fluid, such as air, to generate lift and perform maneuvers.

In an embodiment, and still referring to FIG. 2, fuselage 204 may comprise monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, fuselage 204 may include a semi-monocoque construction. Semi-monocoque construction, as used herein, is a partial monocoque construction, wherein a monocoque construction is describe above detail. In semi-monocoque construction, fuselage 204 may derive some structural support from stressed aircraft skin and some structural support from underlying frame structure made of structural elements. Formers or station frames can be seen running transverse to the long axis of fuselage 204 with circular cutouts which are generally used in real-world manufacturing for weight savings and for the routing of electrical harnesses and other modern on-board systems. In a semi-monocoque construction, stringers are the thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate that there are numerous methods for mechanical fastening of the aforementioned components like crews, nails, dowels, pins, anchors, adhesives like glue or epoxy, or bolts and nuts, to name a few. A subset of fuselage under the umbrella of semi-monocoque construction is unibody vehicles. Unibody, which is short for "unitized body" or alternatively "unitary construction", vehicles are characterized by a construction in which the body, floor plan, and chassis form a single structure. In the aircraft world, unibody would comprise the internal structural elements like formers and stringers are constructed in one piece, integral to the aircraft skin as well as any floor construction like a deck.

Still referring to FIG. 2, stringers and formers which account for the bulk of any aircraft structure excluding monocoque construction can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. The location of said stringers greatly informs the type of forces and loads applied to each and every stringer, all of which may be handled by material selection, cross-sectional area, and mechanical coupling methods of each member. The same assessment may be made for formers. In general, formers are significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 2, stressed skin, when used in semi-monocoque construction is the concept where the skin of an aircraft bears partial, yet significant, load in the overall structural hierarchy. In other words, the internal structure, whether it be a frame of welded tubes, formers and stringers, or some combination, is not sufficiently strong enough by design to bear all loads. The concept of stressed skin is applied in monocoque and semi-monocoque construction methods of fuselage 204. Monocoque comprises only structural skin, and in that sense, aircraft skin undergoes stress by applied aerodynamic fluids imparted by the fluid. Stress as used in continuum mechanics can be described in pound-force per square inch ($lbf/in^2$) or Pascals (Pa). In semi-monocoque construction stressed skin bears part of the aerodynamic loads and additionally imparts force on the underlying structure of stringers and formers.

Still referring to FIG. 2, it should be noted that an illustrative embodiment is presented only, and this disclosure in no way limits the form or construction of eVTOL aircraft 200. In embodiments, fuselage 204 may be configurable based on the needs of the eVTOL per specific mission or objective. The general arrangement of components, structural elements, and hardware associated with storing and/or moving a payload may be added or removed from fuselage 204 as needed, whether it is stowed manually, automatedly, or removed by personnel altogether. Fuselage 204 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 204 may also be configurable to accept certain specific cargo containers, or a receptable that can, in turn, accept certain cargo containers.

Still referring to FIG. 2, eVTOL aircraft 200 may include a plurality of laterally extending elements 208 attached to fuselage 204. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section may geometry comprises an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. In an embodiment, and without limitation, wing may include a leading edge. As used in this disclosure a "leading edge" is a foremost edge of an airfoil that first intersects with the external medium. For example, and without limitation, leading edge may include one or more edges that may comprise one or more characteristics such as sweep, radius and/or stagnation point, droop, thermal effects, and the like thereof. In an embodiment, and without limitation, wing may include a trailing edge. As used in this disclosure a "trailing edge" is a rear edge of an airfoil. In an embodiment, and without limitation, trailing edge may include an edge capable of controlling the direction of the departing medium from the wing, such that a controlling force is exerted on the aircraft. Laterally extending element 208 may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 2, eVTOL aircraft 200 may include a plurality of lift components 212 attached to the plurality of extending elements 208. As used in this disclosure a "lift component" is a component and/or device used to propel a craft upward by exerting downward force on a fluid medium, which may include a gaseous medium such as air or a liquid medium such as water. Lift component 212 may include any device or component that consumes electrical power on demand to propel an electric aircraft in a direction or other vehicle while on ground or in-flight. For example, and without limitation, lift component 212 may include a rotor, propeller, paddle wheel and the like thereof, wherein a rotor is a component that produces torque along a longitudinal axis, and a propeller produces torquer along a vertical axis. In an embodiment, lift component 212 may include a propulsor. In an embodiment, when a propulsor twists and pulls air behind it, it will, at the same time, push an aircraft forward with an equal amount of force. As a further non-limiting example, lift component 212 may include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like. The more air pulled behind an aircraft, the greater the force with which the aircraft is pushed forward.

In an embodiment, and still referring to FIG. 2, lift component 212 may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift component 212 may include a rotating power-driven hub, to which are attached several radial airfoil-section blades such that the whole assembly rotates about a longitudinal axis. The blades may be configured at an angle of attack. In an embodiment, and without limitation, angle of attack may include a fixed angle of attack. As used in this disclosure an "fixed angle of attack" is fixed angle between the chord line of the blade and the relative wind. As used in this disclosure a "fixed angle" is an angle that is secured and/or unmovable from the attachment point. For example, and without limitation fixed angle of attack may be 2.8° as a function of a pitch angle of 8.1° and a relative wind angle 5.3°. In another embodiment, and without limitation, angle of attack may include a variable angle of attack. As used in this disclosure a "variable angle of attack" is a variable and/or moveable angle between the chord line of the blade and the relative wind. As used in this disclosure a "variable angle" is an angle that is moveable from the attachment point. For example, and without limitation variable angle of attack may be a first angle of 4.7° as a function of a pitch angle of 7.1° and a relative wind angle 2.4°, wherein the angle adjusts and/or shifts to a second angle of 2.7° as a function of a pitch angle of 5.1° and a relative wind angle 2.4°. In an embodiment, angle of attack be configured to produce a fixed pitch angle. As used in this disclosure a "fixed pitch angle" is a fixed angle between a cord line of a blade and the rotational velocity direction. For example, and without limitation, fixed pitch angle may include 18°. In another embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine the speed of the forward movement as the blade rotates.

In an embodiment, and still referring to FIG. 2, lift component 212 may be configured to produce a lift. As used in this disclosure a "lift" is a perpendicular force to the oncoming flow direction of fluid surrounding the surface. For example, and without limitation relative air speed may be horizontal to eVTOL aircraft 200, wherein the lift force may be a force exerted in the vertical direction, directing eVTOL aircraft 200 upwards. In an embodiment, and without limitation, lift component 212 may produce lift as a function of applying a torque to lift component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. In an embodiment, and without limitation, lift component 212 may receive a source of power and/or energy from a power sources may apply a torque on lift component 212 to produce lift. As used in this disclosure a "power source" is a source that that drives and/or controls any component attached to eVTOL aircraft 200. For example, and without limitation power source may include a motor that operates to move one or more lift components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking.

Still referring to FIG. 2, power source may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which eVTOL aircraft 200 may be incorporated.

In an embodiment, and still referring to FIG. 2, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source. Batteries may be primary or secondary or a combination of both. Additional disclosure related to batteries and battery modules may be found in co-owned U.S. Patent Applications entitled "SYSTEM AND METHOD FOR HIGH ENERGY DENSITY BATTERY MODULE" and "SYSTEMS AND METHODS FOR RESTRICTING POWER TO A LOAD TO PREVENT ENGAGING CIRCUIT PROTECTION DEVICE FOR AN AIRCRAFT," having U.S. patent application Ser. Nos. 16/948,140 and 16/590,496 respectively; the entirety of both applications are incorporated herein by reference.

Still referring to FIG. 2, an energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference.

Still referring to FIG. 2, eVTOL aircraft 200 may include at least a longitudinal thrust component 216. As used in this disclosure a "longitudinal thrust component" is a flight component that is mounted such that the component thrusts the flight component through a medium. As a non-limiting example, longitudinal thrust flight component 216 may include a pusher flight component such as a pusher propeller, a pusher motor, a pusher propulsor, and the like. Additionally, or alternatively, pusher flight component may include a plurality of pusher flight components. As a further non-limiting example, longitudinal thrust flight component may include a puller flight component such as a puller propeller, a puller motor, a puller propulsor, and the like. Additionally, or alternatively, puller flight component may include a plurality of puller flight components.

Figure 3:
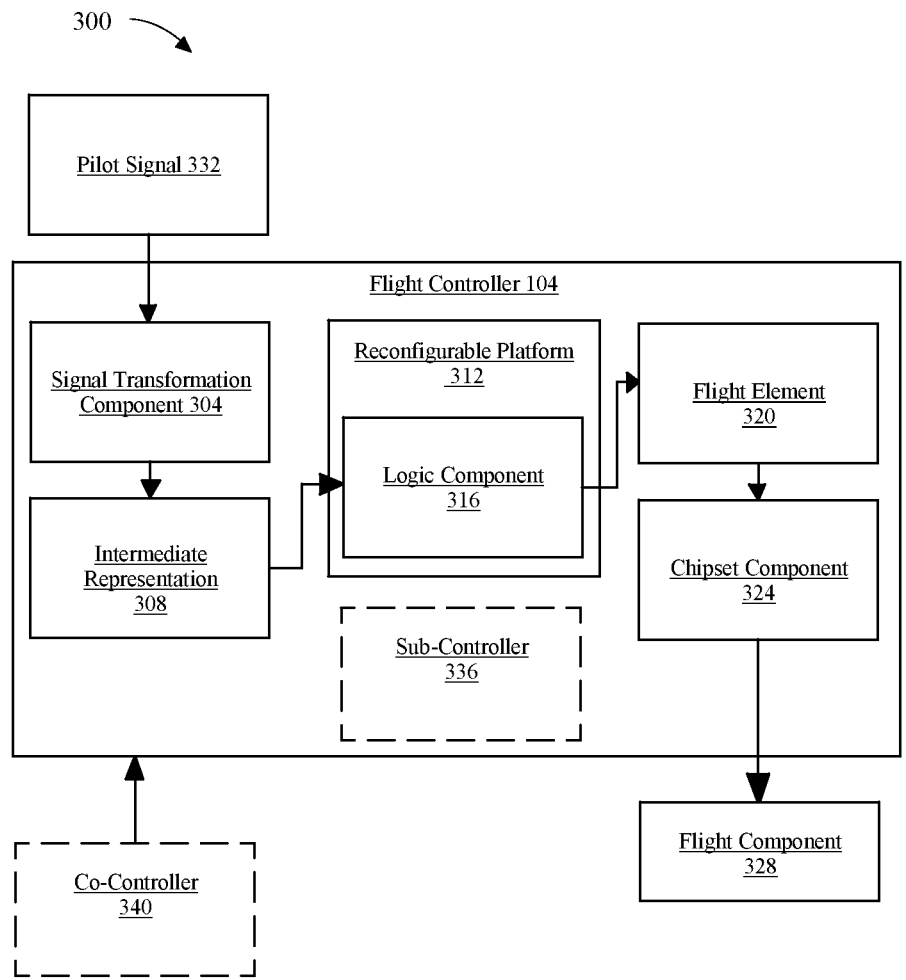
FIG. 3 is a block diagram of an exemplary embodiment of a flight controller.

Now referring to FIG. 3, an exemplary embodiment 300 of a flight controller 104 is illustrated. As used in this disclosure a "flight controller" is a computing device of a plurality of computing devices dedicated to data storage, security, distribution of traffic for load balancing, and flight instruction. Flight controller 104 may include and/or communicate with any computing device as described in this disclosure, including without limitation a microcontroller, microprocessor, digital signal processor (DSP) and/or system on a chip (SoC) as described in this disclosure. Further, flight controller 104 may include a single computing device operating independently, or may include two or more computing device operating in concert, in parallel, sequentially or the like; two or more computing devices may be included together in a single computing device or in two or more computing devices. In embodiments, flight controller 104 may be installed in an aircraft, may control the aircraft remotely, and/or may include an element installed in the aircraft and a remote element in communication therewith.

In an embodiment, and still referring to FIG. 3, flight controller 104 may include a signal transformation component 304. As used in this disclosure a "signal transformation component" is a component that transforms and/or converts a first signal to a second signal, wherein a signal may include one or more digital and/or analog signals. For example, and without limitation, signal transformation component 304 may be configured to perform one or more operations such as preprocessing, lexical analysis, parsing, semantic analysis, and the like thereof. In an embodiment, and without limitation, signal transformation component 304 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 304 may include transforming one or more low-level languages such as, but not limited to, machine languages and/or assembly languages. For example, and without limitation, signal transformation component 304 may include transforming a binary language signal to an assembly language signal. In an embodiment, and without limitation, signal transformation component 304 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 3, signal transformation component 304 may be configured to optimize an intermediate representation 308. As used in this disclosure an "intermediate representation" is a data structure and/or code that represents the input signal. Signal transformation component 304 may optimize intermediate representation as a function of a data-flow analysis, dependence analysis, alias analysis, pointer analysis, escape analysis, and the like thereof. In an embodiment, and without limitation, signal transformation component 304 may optimize intermediate representation 308 as a function of one or more inline expansions, dead code eliminations, constant propagation, loop transformations, and/or automatic parallelization functions. In another embodiment, signal transformation component 304 may optimize intermediate representation as a function of a machine dependent optimization such as a peephole optimization, wherein a peephole optimization may rewrite short sequences of code into more efficient sequences of code. Signal transformation component 304 may optimize intermediate representation to generate an output language, wherein an "output language," as used herein, is the native machine language of flight controller 104. For example, and without limitation, native machine language may include one or more binary and/or numerical languages.

In an embodiment, and without limitation, signal transformation component 304 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 3, flight controller 104 may include a reconfigurable hardware platform 316. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 316 may be reconfigured to enact any algorithm and/or algorithm selection process received from another computing device and/or created using machine-learning processes.

Still referring to FIG. 3, reconfigurable hardware platform 316 may include a logic component 316. As used in this disclosure a "logic component" is a component that executes instructions on output language. For example, and without limitation, logic component may perform basic arithmetic, logic, controlling, input/output operations, and the like thereof. Logic component 316 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 316 may be organized according to Von Neumann and/or Harvard architecture as a non-limiting example. Logic component 316 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 316 may include one or more integrated circuit microprocessors, which may contain one or more central processing units, central processors, and/or main processors, on a single metal-oxide-semiconductor chip. Logic component 316 may be configured to execute a sequence of stored instructions to be performed on the output language and/or intermediate representation 308. Logic component 316 may be configured to fetch and/or retrieve the instruction from a memory cache, wherein a "memory cache," as used in this disclosure, is a stored instruction set on flight controller 104. Logic component 316 may be configured to decode the instruction retrieved from the memory cache to opcodes and/or operands. Logic component 316 may be configured to execute the instruction on intermediate representation 308 and/or output language. For example, and without limitation, logic component 316 may be configured to execute an addition operation on intermediate representation 308 and/or output language.

In an embodiment, and without limitation, logic component 316 may be configured to calculate a flight element 320. As used in this disclosure a "flight element" is an element of datum denoting a relative status of aircraft. For example, and without limitation, flight element 320 may denote one or more torques, thrusts, airspeed velocities, forces, altitudes, groundspeed velocities, directions during flight, directions facing, forces, orientations, and the like thereof. For example, and without limitation, flight element 320 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 320 may denote that aircraft is following a flight path accurately and/or sufficiently.

Still referring to FIG. 3, flight controller 104 may include a chipset component 324. As used in this disclosure a "chipset component" is a component that manages data flow. In an embodiment, and without limitation, chipset component 324 may include a northbridge data flow path, wherein the northbridge dataflow path may manage data flow from logic component 316 to a high-speed device and/or component, such as a RAM, graphics controller, and the like thereof. In another embodiment, and without limitation, chipset component 324 may include a southbridge data flow path, wherein the southbridge dataflow path may manage data flow from logic component 316 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 324 may manage data flow between logic component 316, memory cache, and a flight component 328. As used in this disclosure a "flight component" is a portion of an aircraft that can be moved or adjusted to affect one or more flight elements. For example, flight component 328 may include a component used to affect the aircrafts' roll and pitch which may comprise one or more ailerons. As a further example, flight component 328 may include a rudder to control yaw of an aircraft. In an embodiment, chipset component 324 may be configured to communicate with a plurality of flight components as a function of flight element 320. For example, and without limitation, chipset component 324 may transmit to an aircraft rotor to reduce torque of a first lift propulsor and increase the forward thrust produced by a pusher component to perform a flight maneuver.

In an embodiment, and still referring to FIG. 3, flight controller 104 may be configured generate an autonomous function, wherein an autonomous function is a mode and/or function of flight controller 104 that controls aircraft automatically as described above, in reference to FIG. 1. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 320. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 104 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 104 will control the ailerons and/or rudders. As used in this disclosure "non-autonomous mode" is a mode that denotes a pilot will control aircraft and/or maneuvers of aircraft in its entirety.

In an embodiment, and still referring to FIG. 3, flight controller 104 may generate autonomous function as a function of an autonomous machine-learning model. As used in this disclosure an "autonomous machine-learning model" is a machine-learning model to produce an autonomous function output given flight element 320 and a pilot signal 332 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 332 may denote that a pilot is controlling and/or maneuvering ailerons, wherein the pilot is not in control of the rudders and/or propulsors. In an embodiment, pilot signal 332 may include an implicit signal and/or an explicit signal. For example, and without limitation, pilot signal 332 may include an explicit signal, wherein the pilot explicitly states there is a lack of control and/or desire for autonomous function. As a further non-limiting example, pilot signal 332 may include an explicit signal directing flight controller 104 to control and/or maintain a portion of aircraft, a portion of the flight plan, the entire aircraft, and/or the entire flight plan. As a further non-limiting example, pilot signal 332 may include an implicit signal, wherein flight controller 104 detects a lack of control such as by a malfunction, torque alteration, flight path deviation, and the like thereof. In an embodiment, and without limitation, pilot signal 332 may include one or more explicit signals to reduce torque, and/or one or more implicit signals that torque may be reduced due to reduction of airspeed velocity. In an embodiment, and without limitation, pilot signal 332 may include one or more local and/or global signals. For example, and without limitation, pilot signal 332 may include a local signal that is transmitted by a pilot and/or crew member. As a further non-limiting example, pilot signal 332 may include a global signal that is transmitted by air traffic control and/or one or more remote users that are in communication with the pilot of aircraft. In an embodiment, pilot signal 332 may be received as a function of a tri-state bus and/or multiplexor that denotes an explicit pilot signal should be transmitted prior to any implicit or global pilot signal.

Still referring to FIG. 3, autonomous machine-learning model may include one or more autonomous machine-learning processes such as supervised, unsupervised, or reinforcement machine-learning processes that flight controller 104 and/or a remote device may or may not use in the generation of autonomous function. As used in this disclosure "remote device" is an external device to flight controller 104. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 3, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 104 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 3, flight controller 104 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 104. Remote device and/or FPGA may transmit a signal, bit, datum, or parameter to flight controller 104 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 104 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 3, flight controller 104 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 3, flight controller 104 may include, but is not limited to, for example, a cluster of flight controllers in a first location and a second flight controller or cluster of flight controllers in a second location. Flight controller 104 may include one or more flight controllers dedicated to data storage, security, distribution of traffic for load balancing, and the like. Flight controller 104 may be configured to distribute one or more computing tasks as described below across a plurality of flight controllers, which may operate in parallel, in series, redundantly, or in any other manner used for distribution of tasks or memory between computing devices. For example, and without limitation, flight controller 104 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 3, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 328. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 3, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 104. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 308 and/or output language from logic component 316, wherein output language may include one or more analog-to-digital conversions, low bit rate transmissions, message encryptions, digital signals, binary signals, logic signals, analog signals, and the like thereof described above in detail.

Still referring to FIG. 3, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 3, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 3, flight controller 104 may also be implemented using a "shared nothing" architecture in which data is cached at the worker, in an embodiment, this may enable scalability of aircraft and/or computing device. Flight controller 104 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 3, flight controller may include a sub-controller 336. As used in this disclosure a "sub-controller" is a controller and/or component that is part of a distributed controller as described above; for instance, flight controller 104 may be and/or include a distributed flight controller made up of one or more sub-controllers. For example, and without limitation, sub-controller 336 may include any controllers and/or components thereof that are similar to distributed flight controller and/or flight controller as described above. Sub-controller 336 may include any component of any flight controller as described above. Sub-controller 336 may be implemented in any manner suitable for implementation of a flight controller as described above. As a further non-limiting example, sub-controller 336 may include one or more processors, logic components and/or computing devices capable of receiving, processing, and/or transmitting data across the distributed flight controller as described above. As a further non-limiting example, sub-controller 336 may include a controller that receives a signal from a first flight controller and/or first distributed flight controller component and transmits the signal to a plurality of additional sub-controllers and/or flight components.

Still referring to FIG. 3, flight controller may include a co-controller 340. As used in this disclosure a "co-controller" is a controller and/or component that joins flight controller 104 as components and/or nodes of a distributer flight controller as described above. For example, and without limitation, co-controller 340 may include one or more controllers and/or components that are similar to flight controller 104. As a further non-limiting example, co-controller 340 may include any controller and/or component that joins flight controller 104 to distributer flight controller. As a further non-limiting example, co-controller 340 may include one or more processors, logic components and/or computing devices capable of receiving, processing, and/or transmitting data to and/or from flight controller 104 to distributed flight control system. Co-controller 340 may include any component of any flight controller as described above. Co-controller 340 may be implemented in any manner suitable for implementation of a flight controller as described above.

In an embodiment, and with continued reference to FIG. 3, flight controller 104 may be designed and/or configured to perform any method, method step, or sequence of method steps in any embodiment described in this disclosure, in any order and with any degree of repetition. For instance, flight controller 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
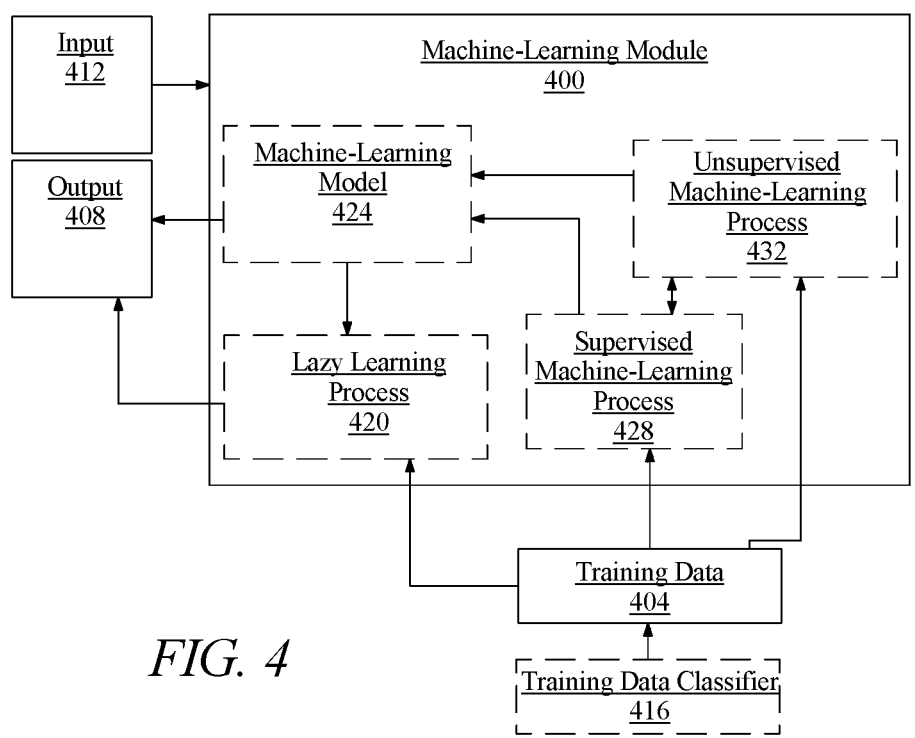
FIG. 4 is a block diagram of an exemplary embodiment of a machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below.

Training data 404 used by machine-learning module 400 may correlate any input data as described in this disclosure to any output data as described in this disclosure. As a non-limiting illustrative example flight elements and/or pilot signals may be inputs, wherein an output may be an autonomous function.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
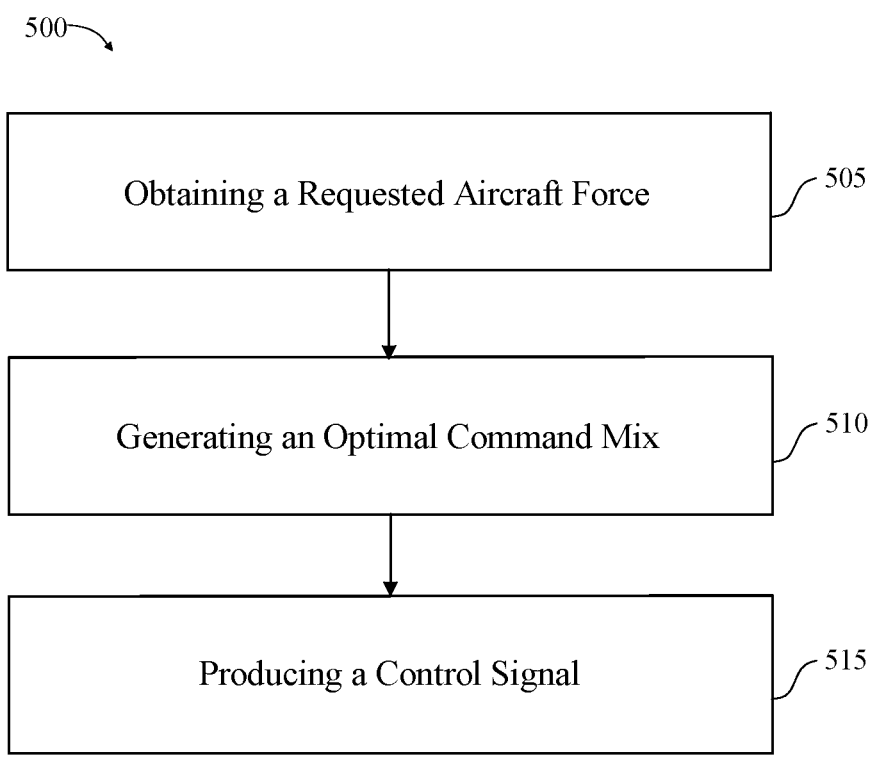
FIG. 5, is a flow diagram illustrating a method for producing a control signal of an electric vertical take-off and landing (eVTOL) aircraft according to an embodiment of the invention.

Now referring to FIG. 5, a method 500 for producing a control signal of an electric vertical take-off and landing (eVTOL) aircraft is illustrated. At step 505, a flight controller 104 obtains a requested aircraft force 108. Flight controller 104 includes any of the flight controller 104 as described above, in reference to FIGS. 1-4. Requested aircraft force 108 includes any of the requested aircraft force 108 as described above, in reference to FIGS. 1-4.

Still referring to FIG. 5, at step 510, flight controller 104 generates an optimal command mix 112 as a function of requested aircraft force 108. Optimal command mix 112 includes any of the optimal command mix 112 as described above, in reference to FIGS. 1-4. Optimal command mix 112 includes a plurality of commands to a plurality of actuators. Commands includes any of the commands as described above, in reference to FIGS. 1-4. Actuator includes any of the actuator as described above, in reference to FIGS. 1-4. Flight controller 104 generates optimal command mix 112 as a function of receiving an ideal actuator model 116 includes at least a performance parameter 120. Ideal actuator model 116 includes any of the ideal actuator model 116 as described above, in reference to FIGS. 1-4. Performance parameter 120 includes any of the performance parameter 120 as described above, in reference to FIGS. 1-4. Flight controller 104 generates optimal command mix 112 as a function of producing a model datum 124 as a function of ideal actuator model 116. Model datum 124 includes any of the model datum 124 as described above, in reference to FIGS. 1-4. Flight controller 104 generates optimal command mix 112 as a function of requested aircraft force 108 and model datum 124.

Still referring to FIG. 5, at step 515, flight controller 104 produces a control signal 128 as a function of optimal command mix 112. Control signal 128 includes any of the control signal 128 as described above, in reference to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
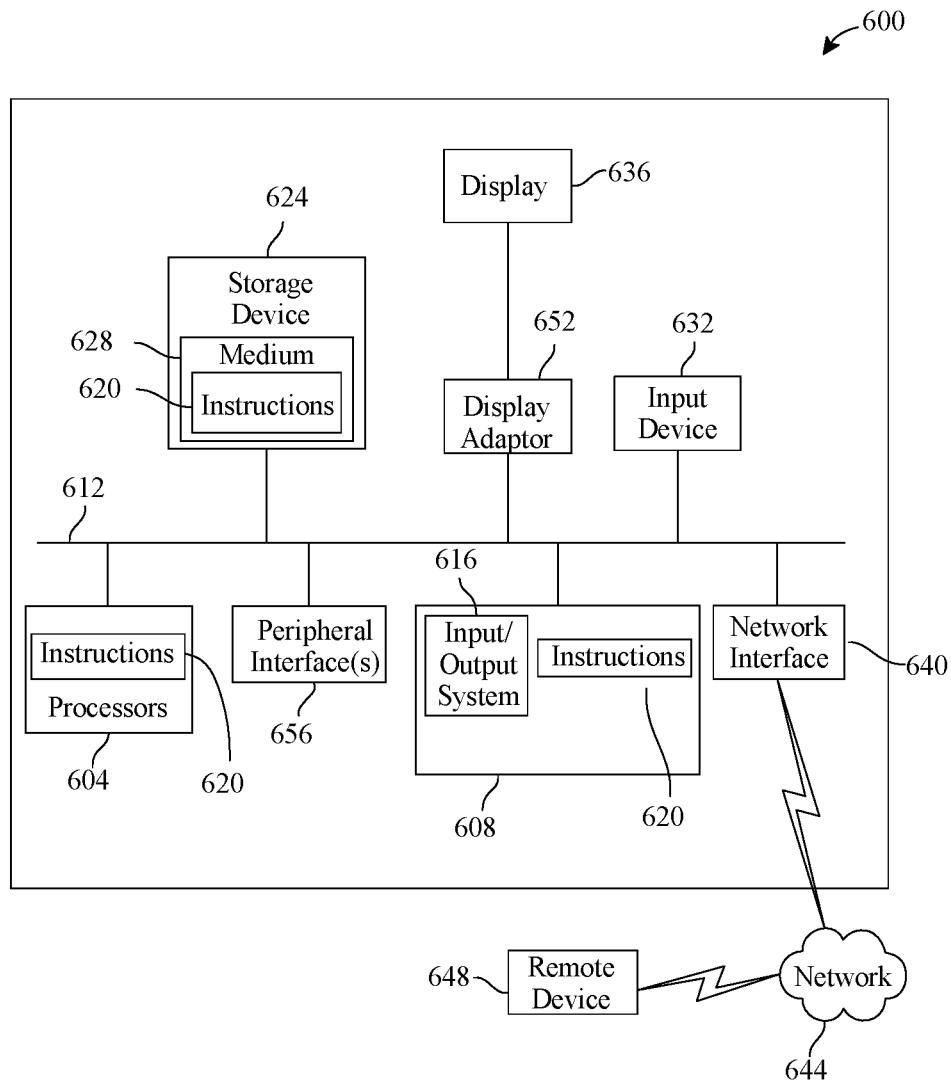
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for producing a control signal of an electric vertical take-off and landing (eVTOL) aircraft, the system comprising:
    a flight controller communicatively connected to an eVTOL aircraft, wherein the flight controller is configured to:
      obtain a requested aircraft force;
      generate an optimal command mix, wherein the optimal command mix includes a plurality of commands to a plurality of actuators as a function of the requested aircraft force, wherein generating the optimal command mix further comprises:
        receiving an ideal actuator model including at least a performance parameter;
        producing a model datum as a function of the ideal actuator model; and
        generating the optimal command mix as a function of the requested aircraft force and the model datum; and
      produce a control signal as a function of the optimal command mix, wherein the control signal comprises a first command directed to a first actuator coupled to a first flight component of the eVTOL aircraft and a second command directed to a second actuator coupled to a second flight component of the eVTOL direct, wherein the first flight component comprises a lift component configured to provide lift to the eVTOL aircraft, wherein the first flight component is attached to a boom extending parallel to a fuselage of the eVTOL aircraft, wherein the second flight component comprises a longitudinal thrust component configured to provide a forward thrust to the eVTOL aircraft, and wherein the longitudinal thrust component is attached to a tail end of the fuselage.

2. The system of claim 1, wherein obtaining the requested aircraft force further comprises receiving a pilot input.

3. The system of claim 1, wherein generating the optimal command mix further comprises receiving a sensor input.

4. The system of claim 1, wherein generating the optimal command mix further comprises determining an effectivity element.

5. The system of claim 4, wherein determining the effectivity element further comprises identifying an effectiveness of a flight component.

6. The system of claim 1, wherein generating the optimal command mix further comprises dynamically varying the plurality of actuators as a function of the requested aircraft force.

7. The system of claim 6, wherein dynamically varying the plurality of actuators further comprises producing an effectivity simulation.

8. The system of claim 1, wherein generating the optimal command mix further comprises:
    training an optimal machine-learning model as a function of an optimal training set relating a plurality of model data to a plurality of requested aircraft forces; and
    generating the optimal command mix as a function of the trained optimal machine-learning model, wherein the trained optimal machine-learning model receives the requested aircraft force and the model datum and outputs the optimal command mix.

9. The system of claim 1, wherein producing the control signal further comprises generating an autonomous function configured to enact the control signal automatically.

10. The system of claim 1, wherein producing the control signal further comprises transmitting a notification to a pilot.

11. A method for producing a control signal of an electric vertical take-off and landing (eVTOL) aircraft, the method comprising:
    obtaining, by a flight controller communicatively connected to an eVTOL aircraft, a requested aircraft force;
    generating, by the flight controller, an optimal command mix, wherein the optimal command mix includes a plurality of commands to a plurality of actuators as a function of the requested aircraft force, wherein generating the optimal command mix further comprises:
      receiving an ideal actuator model including at least a performance parameter;
      producing a model datum as a function of the ideal actuator model; and
      generating the optimal command mix as a function of the requested aircraft force and the model datum; and
    producing, by the flight controller, a control signal as a function of the optimal command mix, wherein the control signal comprises a first command directed to a first actuator coupled to a first flight component of the eVTOL aircraft and a second command directed to a second actuator coupled to a second flight component of the eVTOL direct, wherein the first flight component comprises a lift component configured to provide lift to the eVTOL aircraft, wherein the first flight component is attached to a boom extending parallel to a fuselage of the eVTOL aircraft, wherein the second flight component comprises a longitudinal thrust component configured to provide a forward thrust to the eVTOL aircraft, and wherein the longitudinal thrust component is attached to a tail end of the fuselage.

12. The method of claim 11, wherein obtaining the requested aircraft force further comprises receiving a pilot input.

13. The method of claim 11, wherein generating the optimal command mix further comprises receiving a sensor input.

14. The method of claim 11, wherein generating the optimal command mix further comprises determining an effectivity element.

15. The method of claim 14, wherein determining the effectivity element further comprises identifying an effectiveness of a flight component.

16. The method of claim 11, wherein generating the optimal command mix further comprises dynamically varying the plurality of actuators as a function of the requested aircraft force.

17. The method of claim 16, wherein dynamically varying the plurality of actuators further comprises producing an effectivity simulation.

18. The method of claim 11, wherein generating the optimal command mix further comprises:
   training an optimal machine-learning model as a function of an optimal training set relating a plurality of model data to a plurality of requested aircraft forces; and
   generating the optimal command mix as a function of the trained optimal machine-learning model, wherein the trained optimal machine-learning model receives the requested aircraft force and the model datum and outputs the optimal command mix.

19. The method of claim 11, wherein producing the control signal further comprises generating an autonomous function configured to enact the control signal automatically.

20. The method of claim 11, wherein producing the control signal further comprises transmitting a notification to a pilot.

* * * * *